(12) United States Patent
Sato et al.

(10) Patent No.: US 11,112,371 B2
(45) Date of Patent: Sep. 7, 2021

(54) X-RAY SPECTROMETER

(71) Applicant: Shimadzu Corporation, Kyoto (JP)

(72) Inventors: Kenji Sato, Kyoto (JP); Takuro Izumi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 16/612,092

(22) PCT Filed: May 18, 2017

(86) PCT No.: PCT/JP2017/018701
§ 371 (c)(1),
(2) Date: Nov. 8, 2019

(87) PCT Pub. No.: WO2018/211664
PCT Pub. Date: Nov. 22, 2018

(65) Prior Publication Data
US 2020/0225172 A1 Jul. 16, 2020

(51) Int. Cl.
*G01N 23/207* (2018.01)
*G01N 23/223* (2006.01)

(52) U.S. Cl.
CPC ....... *G01N 23/2076* (2013.01); *G01N 23/223* (2013.01)

(58) Field of Classification Search
CPC ......... G01N 23/2076; G01N 23/20016; G01N 23/2273; G01N 23/223; G01N 23/207; G01N 23/20008
See application file for complete search history.

(56) References Cited

U.S. PATENT DOCUMENTS 3,663,812 A    5/1972  Koenig et al.
4,362,935 A    12/1982 Clark, III
(Continued)

FOREIGN PATENT DOCUMENTS

DE    14 72 229 A1    4/1969
DE    19603000 A1     7/1997
(Continued)

OTHER PUBLICATIONS

Extended European Search Report dated Apr. 16, 2020 for the corresponding European Patent Application No. 17909827.2.
(Continued)

*Primary Examiner* — Yara B Green
(74) *Attorney, Agent, or Firm* — Muir Patent Law, PLLC

(57) ABSTRACT

An X-ray spectrometer is provided with: an excitation source configured to irradiate excitation rays onto an irradiation area of a sample, a diffraction member provided to face the irradiation area; a slit member provided between the irradiation area and the diffraction member, the slit member having a slit extending parallel to the irradiation area and a prescribed surface of the diffraction member; an X-ray linear sensor having a light-incident surface in which a plurality of detection elements are arranged in a direction perpendicular to a longitudinal direction of the slit; a first moving mechanism configured to change an angle between the sample surface and the prescribed surface, and/or a distance between the sample surface and the prescribed surface by moving the diffraction member within a plane perpendicular to the longitudinal direction; and a second moving mechanism configured to position the X-ray linear sensor on a path of characteristic X-rays passed through the slit and diffracted by the prescribed surface by moving the X-ray linear sensor within a plane perpendicular to the longitudinal direction.

13 Claims, 8 Drawing Sheets

(56) References Cited

U.S. PATENT DOCUMENTS

| | | | | |
|---|---|---|---|---|
| 4,852,135 | A | * | 7/1989 | Anisovich .......... G01N 23/2076 378/49 |
| 5,406,608 | A | * | 4/1995 | Yellepeddi ......... G01N 23/2206 378/45 |
| 5,745,543 | A | * | 4/1998 | De Bokx .......... G01N 23/2076 378/45 |
| 5,978,442 | A | * | 11/1999 | Kuwabara .............. G01N 23/20 378/46 |
| 9,417,341 | B2 | | 8/2016 | Erko et al. |
| 2011/0268252 | A1 | * | 11/2011 | Ozawa ...................... G01J 3/12 378/82 |
| 2014/0229118 | A1 | * | 8/2014 | Kinoshita ......... G01N 23/2252 702/23 |
| 2014/0284478 | A1 | | 9/2014 | Sako et al. |
| 2014/0291518 | A1 | | 10/2014 | Seojima |
| 2014/0314207 | A1 | | 10/2014 | Erko et al. |
| 2017/0160213 | A1 | | 6/2017 | Sato et al. |
| 2020/0225172 | A1 | | 7/2020 | Sato et al. |
| 2020/0225173 | A1 | | 7/2020 | Sato et al. |
| 2020/0386696 | A1 | | 12/2020 | Sato et al. |
| 2021/0003520 | A1 | | 1/2021 | Kinugasa |

FOREIGN PATENT DOCUMENTS

| JP | 3-82943 | A | 4/1991 |
|---|---|---|---|
| JP | 2002-189004 | A | 7/2002 |
| JP | 2003-98126 | A | 4/2003 |
| JP | 2009264926 | A | 11/2009 |
| JP | 2013-096750 | A | 5/2013 |
| JP | 2014209098 | A | 11/2014 |
| JP | 2017-223638 | A | 12/2017 |
| SU | 868 503 | A1 | 9/1981 |
| WO | 2016/103834 | A | 6/2016 |

OTHER PUBLICATIONS

Hisashi Hayashi, "Chemistry State Analysis of Cr and Fe Compounds by a Laboratory-use High-Resolution Spectrometer with Spehrically-bent Crystal Analyzers," Progress of X-ray analysis, Japan Society for Analytical Chemistry, X-ray Analysis Research Meeting, published by Agne Technology Center, Mar. 31, 2015, vol. 46, p. 187-201.

Zaharieva et al., "Towards a comprehensive X-ray approach for studying the photosynthetic manganese complex—XANES, Kα/Kβ/ Kβ-satellite emission lines, RIXS, and comparative computational approaches for selected model complexes," Journal of Physics: Conference Series, (UK), published by the British Physical Society, Nov. 5, 2009, vol. 190, Article No. 012142.

Sakurai et al., "Chemical characterization using relative intensity of manganese Kβ' and Kβ5 X-ray fluorescence," Nuclear Instruments and Methods in Physics Research Section B, (Netherlands), published by Elsevier B. V, Jan. 2003, p. 199, p. 391-p. 395.

Written Opinion of the International Searching Authority (ISA237) for PCT application PCT/JP2017/018701, submitted with a machine translation.

Machine Translation of First Office Action, dated Apr. 27, 2021, issued from the Japanese Patent Office in related Japanese Patent Application No. 2019-544339 (5 pages).

Office Action issued from the U.S. Patent and Trademark Office, dated Jan. 21, 2021, for U.S. Appl. No. 16/651,115 (20 pages).

* cited by examiner

X-RAY SPECTROMETER

TECHNICAL FIELD

The present invention relates to an X-ray spectrometer that diffracts characteristic X-rays emitted from a sample irradiated with excitation rays such as primary X-rays and an electron beam to detect intensity for each wavelength.

BACKGROUND ART

When excitation rays, such as, e.g., primary X-rays and an electron beam, are irradiated to a sample, characteristic X-rays having wavelengths specific to the contained elements are emitted from the sample. Therefore, the elemental analysis of the sample can be performed by measuring the intensity of such X-rays for each wavelength.

In Patent Documents 1 and 2, an X-ray spectrometer is described in which an excitation source for irradiating excitation rays to an analysis point of a surface of a sample, a spectroscopic crystal for diffracting X-rays emitted from the sample to which the excitation rays are irradiated, and a detector for detecting X-rays diffracted by the spectroscopic crystal are provided. When the excitation rays are irradiated to the analysis points, characteristic X-rays are emitted from the analysis point in various directions. Focusing on characteristic X-rays of one wavelength, when the spectroscopic crystal is placed in the emission direction of the characteristic X-rays, in the spectroscopic crystal, the characteristic X-rays are diffracted and reflected only when the wavelength of the characteristic X-rays and the incident angle to the spectroscopic crystal satisfy the condition of the Bragg reflection. Therefore, the wavelengths of the peaks of the characteristic X-rays can be determined by measuring the intensity of the X-rays reflected by the spectroscopic crystal at various angles with an X-ray linear sensor. The wavelength of characteristic X-rays measured by the X-ray linear sensor is not always only one, but a plurality of wavelengths may sometimes be measured. In an X-ray spectrometer, a method of measuring characteristic X-rays by measuring intensity for each wavelength in this manner is called a "wavelength dispersion type". In addition to the wavelength dispersion type, the detection method of the X-ray spectrometer includes an "energy dispersion type" that directly detects the energy of characteristic X-rays for each value of the energy, but the wavelength dispersion type can perform an elemental analysis with higher resolution and higher accuracy.

PRIOR ART

Patent Document

Patent Document 1: Japanese Unexamined Patent Application Publication No. 2013-096750
Patent Document 2: Japanese Unexamined Patent Application Publication No. 2002-189004

Non-Patent Document

Non-Patent Document 1: Hisashi Hayashi, "Chemistry analysis of Cr and Fe compounds by laboratory, single crystal type, high resolution X-ray spectrometer", Progress of X-ray analysis, Japan Society for Analytical Chemistry, X-ray Analysis Research Meeting, published by Agne Technology Center, Mar. 31, 2015, vol. 46, p187-201 Non-Patent Document 2: I. Zaharieva and other nine, "Towards a comprehensive X-ray approach for studying the photosynthetic manganese complex—XANES, Kα/Kβ/Kβ-satellite emission lines, RIXS, and comparative computational approaches for selected model complexes", Journal of Physics: Conference Series, (UK), published by the British Physical Society, No. 5, 2009, vol. 190, Article number 012142 Non-Patent Document 3: Kenji Sakurai, Hiromi Eba, "Chemical characterization using relative intensity of manganese Kβ' and Kβ5 X-ray fluorescence", Nuclear Instruments and Methods in Physics Research Section B, (Netherlands), published by Elsevier B. V, January 2003, p199, p391-p395

SUMMARY OF THE INVENTION

Problems to be Solved by the Invention

When measuring a sample in which the composition can be regarded as nearly uniform regardless of the position, such as, e.g., liquid and powder, it is not necessary to narrow the analysis target area to a specific position (analysis point), and the sensitivity of the analysis will become higher when a wider range is irradiated with excitation rays to generate more characteristic X-rays. However, when irradiating excitation rays to a wide area, X-rays of different wavelengths generated at different positions within the range will be reflected in the same direction by the spectroscopic crystal, so the spectroscopic measurement cannot be performed.

The problem to be solved by the present invention is to provide an X-ray spectrometer capable of measuring a composition of a sample, such as, e.g., liquid and powder having a uniform composition regardless of a position, with higher sensitivity than that of a conventional apparatus.

Means for Solving the Problems

In order to solve the above-mentioned problems, the present applicant has proposed an X-ray spectrometer equipped with an excitation source configured to irradiate excitation rays for generating characteristic X-rays to a prescribed irradiation area of a sample surface, a spectroscopic crystal provided to face the irradiation area, a slit provided between the irradiation area and the spectroscopic crystal and arranged parallel to the irradiation area and a prescribed crystal surface of the spectral crystal, and an X-ray linear sensor provided so that a plurality of detection elements are arranged in a direction perpendicular to the longitudinal direction of the slit.

In the above-mentioned X-ray spectrometer (hereinafter also referred to as a "prior application X-ray spectrometer"), when excitation rays are irradiated to a specified irradiation area of a sample surface, characteristic X-rays are emitted in various directions from various positions within the irradiation area, and only those which have passed through the slit reach the spectroscopic crystal. Considering when the irradiation area is divided into a plurality of linear portions parallel to the longitudinal direction of the slit, in the characteristic X-rays of a specific one wavelength (specific wavelength) in the sample, only the characteristic X-rays emitted from a certain one linear portion pass through the slit, and are incident on and diffracted by the spectroscopic crystal at an incident angle satisfying the condition of the Bragg reflection and incident on one detection element of the X-ray linear sensor. Even if X-rays of wavelengths other than the specific wavelength are emitted from the same linear portion and pass through the slit, the X-rays do not satisfy the condition of the Bragg reflection and are not incident on any detection elements of the X-ray linear sensor. The same is applied to X-rays emitted from other linear portions. Therefore, the elemental analysis of the sample can be performed by obtaining the peak wavelength and the intensity of the characteristic X-rays from the detection signal of the X-ray linear sensor. Also, since the characteristic X-rays from linear portions are detected, a greater amount of characteristic X-rays is measured than in a conventional device that detects characteristic X-rays from an analysis point, resulting in higher analytical sensitivity.

However, in the prior application X-ray spectrometer, the wavelength of X-rays incident on the spectroscopic crystal at an angle satisfying the condition of the Bragg reflection from each of (linearly divided) multiple linear portions of the sample surface is decided, and this cannot be changed. Focusing on one linear portion, the angle of X-rays incident on the prescribed crystal surface of the spectroscopic crystal that have emitted from the linear portion and have passed through the slit is determined, and only X-rays of a wavelength (specific wavelength) satisfying the condition of the Bragg reflection at the angle are diffracted at the crystal surface. That is, since the upper and lower limits of the measurable wavelength range are determined by specific wavelengths respectively corresponding to the linear portions positioned at both end portions of the irradiation area, characteristic X-rays of wavelengths outside the range cannot be detected, and therefore the types of elements that can be analyzed by a single device are limited. Further, since the range of the X-ray linear sensor expected by the spectroscopic crystal is limited, when the position and the orientation of the spectroscopic crystal are set for characteristic X-rays of a specific wavelength emitted from a specific linear portion, even if characteristic X-rays of other wavelengths emitted from other linear portions are incident on the spectroscopic crystal at an angle satisfying the Bragg reflection condition, there are some cases in which the diffracted X-rays cannot be received and detected by the X-ray linear sensor. Furthermore, it is not possible to increase the detection sensitivity to measure trace elements or to increase the wavelength (energy) resolution to perform a high precision measurement. That is, there is a problem that the prior application X-ray spectrometer can only perform a measurement under predetermined conditions.

The present invention has been made and aims to enhance the degree of freedom of a measurement by improving the above-mentioned points in the prior application X-ray spectrometer.

A first aspect of an X-ray spectrometer according to the present invention, which was made to achieve the above object, includes:
a) an excitation source configured to irradiate excitation rays for generating characteristic X-rays onto a prescribed irradiation area of a sample,
b) a diffraction member provided to face the irradiation area;
c) a slit member provided between the irradiation area and the diffraction member, the slit member having a slit extending parallel to the irradiation area and a prescribed surface of the diffraction member;
d) an X-ray linear sensor having a light-incident surface in which a plurality of detection elements are arranged in a direction perpendicular to a longitudinal direction of the slit;
e) a first moving mechanism configured to change an angle between the sample surface and the prescribed surface, and/or a distance between the sample surface and the prescribed surface by moving the diffraction member within a plane perpendicular to the longitudinal direction; and
f) a second moving mechanism configured to position the X-ray linear sensor on a path of the characteristic X-rays passed through the slit and diffracted by the prescribed surface by moving the X-ray linear sensor within the plane perpendicular to the longitudinal direction.

The diffraction member is, for example, a spectroscopic crystal or an artificial multilayer film. Further, the prescribed surface denotes a crystal surface of a spectroscopic crystal or an interface of an artificial multilayer film.

The X-ray spectrometer of the above aspect of the present invention can be suitably used for a measurement of a sample in which the composition can be considered to be uniform regardless of the position, like liquid or powder as in the prior application X-ray spectrometer. In the X-ray spectrometer of the above aspect of the present invention, as described later, it is possible to detect X-rays of different wavelengths emitted from the same position on the sample surface, and also possible to detect X-rays of the same wavelength emitted from different positions on the sample surface. Therefore, samples having different compositions depending on the position can also be measured.

As the first moving mechanism, for example, a rotation mechanism that rotates the diffraction member about an axis parallel to the longitudinal direction of the slit, a linear motion mechanism for changing the distance between the sample surface and the prescribed surface in a plane perpendicular to the longitudinal direction, or the combination thereof can be used. Likewise, for the second moving mechanism, for example, a rotation mechanism that rotates an X-ray linear sensor about an axis parallel to the longitudinal direction of the slit, a linear motion mechanism that changes the distance between the prescribed surface and the incident surface in a plane perpendicular to the longitudinal direction, or the combination thereof can be used.

The X-ray spectrometer of the first aspect of the present invention is provided with the first moving mechanism that moves the diffraction member on which the characteristic X-rays generated in the prescribed irradiation area of the sample surface and have passed through the slit and the second moving mechanism that moves the X-ray linear sensor that detects the characteristic X-rays diffracted by the prescribed surface of the diffraction member (crystal surface, etc., of the spectroscopic crystal).

In this X-ray spectrometer, for example, when the angle formed by the prescribed surface of the diffraction member relative to the sample surface is changed by the first moving mechanism, the wavelength satisfying the condition of the Bragg reflection changes. Therefore, characteristic X-rays emitted from the target element can be measured by appropriately changing the measurement wavelength range of the X-rays.

When the optical path length of the characteristic X-rays emitted from the irradiation area and incident on the X-ray linear is changed by changing the distance from the sample surface to the prescribed surface of the diffraction member by the first moving mechanism while fixing the relative positional relationship between the diffraction member and the X-ray linear sensor, the wavelength width of the X-rays incident on each of the plurality of detection elements constituting the incident surface of the X-ray linear sensor changes. Thereby, the measurement wavelength (energy) resolution can be changed.

Furthermore, it is also possible to change the measurement wavelength (energy) resolution by changing the distance from the prescribed surface of the diffraction member to the light-incident surface of the X-ray linear sensor by the second moving mechanism.

As described above, by using the X-ray spectrometer according to the first aspect of the present invention, it is possible to increase the degree of freedom of the measurement as compared with the prior art.

According to the second aspect of the X-ray spectrometer according to the present invention which has been made to achieve the above-described object includes:

a) an excitation source configured to irradiate excitation rays for generating characteristic X-rays to a prescribed irradiation area of the sample surface;

b) a diffraction member provided to face the irradiation area;

c) a variable slit member arranged between the irradiation area and the diffraction member, the slit member having a first slit extending parallel to the irradiation area and the prescribed surface of the diffraction member, the variable slit member being configured to adjust an opening width of the first slit or select the first slit from a plurality of slits; and d) an X-ray linear sensor arranged on a path of characteristic X-rays passed through the first slit and diffracted by the prescribed surface and provided with a light-incident surface in which a plurality of detection elements are arranged in a direction perpendicular to a longitudinal direction of the first slit.

In the X-ray spectrometer of the second aspect of the present invention, by changing the opening width of the slit of the variable slit member provided between the irradiation area of the sample surface and the diffraction member, among the characteristic X-rays generated in the irradiation area, the light quantity of the characteristic X-rays diffracted by the diffraction grating and incident on the X-ray linear sensor can be changed. That is, the wavelength (energy) resolution can be increased by narrowing the opening width of the slit, and the measurement sensitivity can be increased by widening the opening width of the slit. Therefore, even by using the X-ray spectrometer according to the second aspect of the present invention, it is possible to increase the degree of freedom of measurement as compared with the prior art. The variable slit member may be implemented, for example, with a variable slit member in which the opening width of the slit can be changed by moving two rectangular slit plates or with a variable slit member having a plurality of slit plates having different opening widths that are switchable.

Effects of the Invention

By using the X-ray spectrometer according to the first aspect or the second aspect of the present invention, it is possible to measure a composition of a sample or the like having a uniform composition regardless of the position, such as, e.g., liquid or powder, with higher sensitivity than that of a conventional device. Further, the degree of freedom of measurement can be increased more than that of the prior application X-ray spectrometer.

EMBODIMENTS FOR CARRYING OUT THE INVENTION

Before describing examples of the X-ray spectrometer according to the present invention, the schematic configuration of the prior application X-ray spectrometer will be described.

Figure 1:
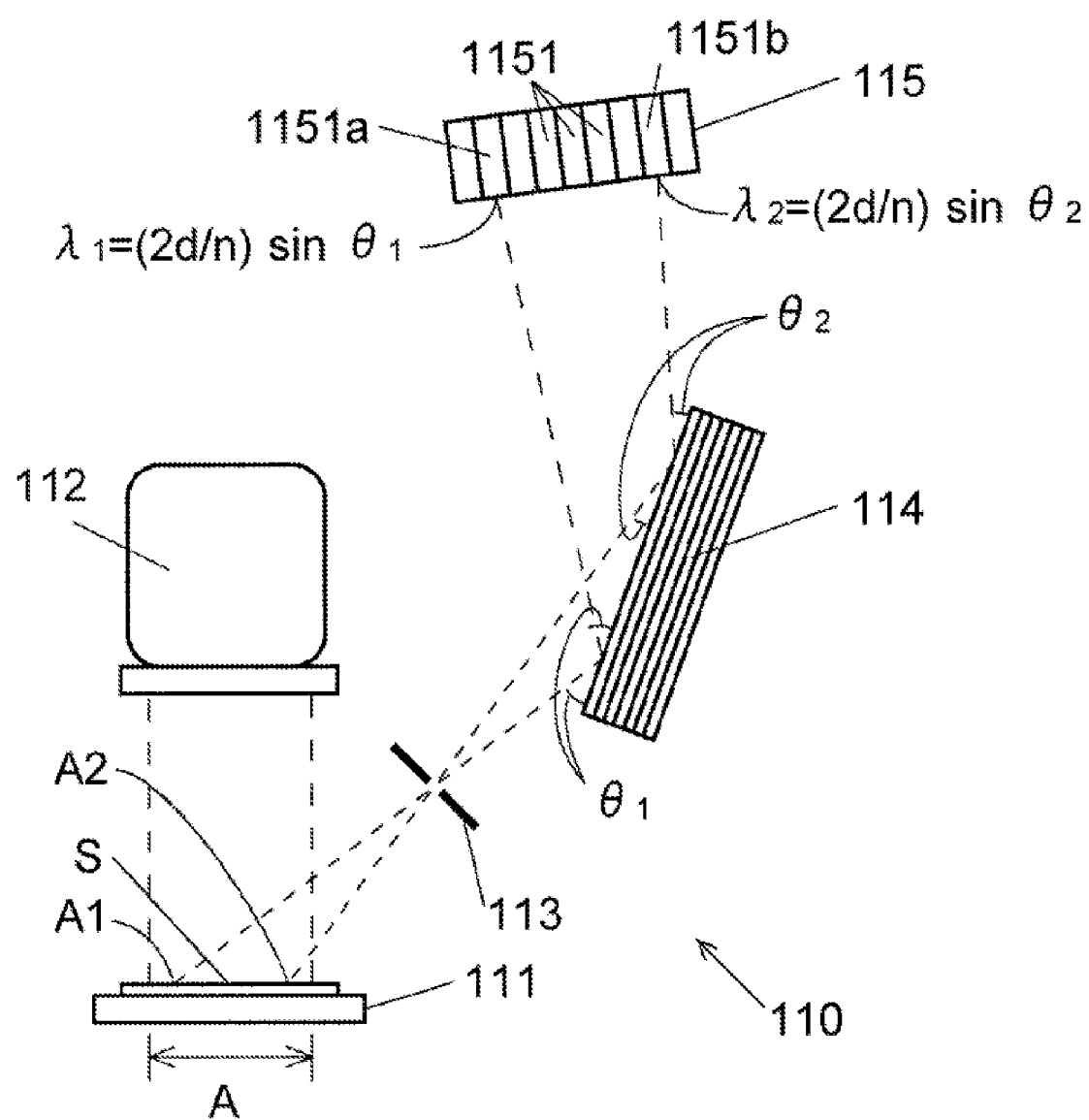
FIG. 1 is a schematic configuration diagram of the prior application X-ray spectrometer.

The X-ray spectrometer 110 of the prior application is provided with, as shown in FIG. 1, a sample holder 111 for holding a sample S, an excitation source 112, a slit member 113, a spectroscopic crystal 114, and an X-ray linear sensor 115. The sample S may be a solid sample, a liquid sample or a gas sample, and as the sample holder 111, a sample holder corresponding to the state of the sample is used.

The excitation source 112 is an X-ray source for irradiating X-rays, which are excitation light (excitation rays), to a sample S. Instead of the X-ray source, an electron beam source may be used. By this excitation source 112, excitation light is irradiated to the planar irradiation area A on the sample S. Here, the excitation light is vertically irradiated to the irradiation area A, but the excitation light may be irradiated at an inclined angle with respect to the irradiation area A.

The slit member 113 is arranged between the irradiation area A and the spectroscopic crystal 114. As the spectroscopic crystal 114, a spectroscopic crystal in which the distance between crystal surfaces which causes the Bragg reflection is minimum, i.e., the crystal surface with the smallest diffraction angle is parallel to the crystal surface is used. By using this spectroscopic crystal 114 in the range in which the diffraction angle is small, only the crystal surface in which the crystal surface distance is smallest is used for the detection of characteristic X-rays to thereby prevent false detection of characteristic X-rays caused the Bragg reflection on other crystal surfaces. The slit member 113 is arranged parallel to (vertically to the paper surface in FIG. 1) the irradiation area A and the crystal surface of the spectroscopic crystal 114 (that is, the surface of the spectroscopic crystal 114) used for detecting the characteristic X-rays. In the following description, this crystal surface is called a "prescribed crystal surface".

The X-ray linear sensor 115 is configured such that a plurality of linear detection elements 1151 having a length in a direction parallel to the longitudinal direction of the slit (perpendicular to the paper surface of FIG. 1) are arranged in a direction perpendicular to the longitudinal direction of the slit. Each detection element 1151 only needs to detect the intensity of the X-rays incident thereon, and the function of detecting the wavelength or the energy of the incident X-rays is not necessary.

Figure 2:
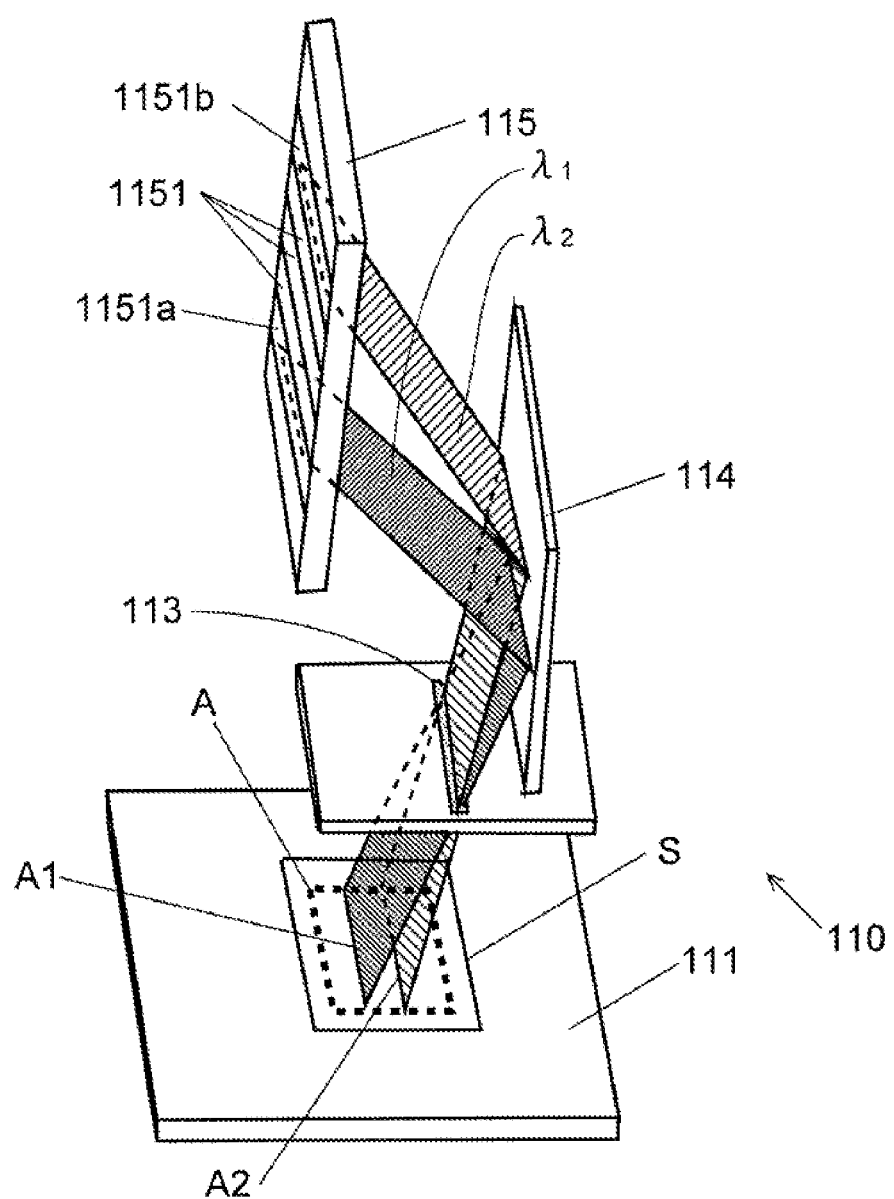
FIG. 2 is a perspective diagram showing a path until characteristic X-rays emitted from an irradiation area of excitation light is detected by an X-ray linear sensor in the prior application X-ray spectrometer.

Referring to FIG. 1 and FIG. 2, the operation of the prior application X-ray spectrometer 110 will be described.

In a state in which a sample S is held by the sample holder 111, X-rays, which is excitation light, are irradiated from the excitation source 112 to the irradiation area A of the sample S. As a result, characteristic X-rays having different wavelengths depending on the elements constituting the sample S are emitted from the entire irradiation area A.

Among the characteristic X-rays emitted from the irradiation area A, in the linear portion within the irradiation area A parallel to the longitudinal direction of the slit, only the characteristic X-rays emitted in a direction incidence on the prescribed crystal surface parallel to the surface of the spectroscopic crystal 114 and the prescribed crystal surface parallel to the surface of the spectroscopic crystal 114 at a specific one incident angle (90-θ)° θ is a diffraction angle when the characteristic X-rays are Bragg-reflected) pass through the slit. In the linear portions having different positions, incident angles of the characteristic X-rays passed through the slit and incident on the spectroscopic crystal 114 are different. For example, the characteristic X-rays emitted from the linear portion A1 shown in FIG. 1 and FIG. 2 are incident on the spectroscopic crystal 114 at one incident angle $(90-\theta_1)°$ and the characteristic X-rays emitted from another linear portion A2 is incident on the spectroscopic crystal 114 at another incident angle $(90-\theta_2)°$.

The characteristic X-rays incident on the spectroscopic crystal 114 from each linear portion within the irradiation area A is diffracted (reflected) at a diffraction angle θ only when they have a wavelength satisfying $\lambda=(2d/n)\sin\theta$ (λ is a wavelength of characteristic X-rays, d is a crystal surface distance of the spectroscopic crystal 114, n is the order), which is the condition of the Bragg reflection. The characteristic X-rays diffracted (reflected) by the spectroscopic crystal 114 are detected by one of the detection elements 1151 of the X-ray linear sensor 115. As described above, the characteristic X-rays are incident on the spectroscopic crystal 114 at a specific one incident angle (90θ)° which differs depending on the linear portion within the irradiation area A. Therefore, only the characteristic X-rays having a specific wavelength which differs for each linear portion are incident on the X-ray linear sensor 115 and detected by a different detection element 1151. For example, in the characteristic X-rays emitted from the linear portion A1 shown in FIG. 1 and FIG. 2, only the characteristic X-rays having a wavelength $\lambda_1=(2d/n)\sin\theta_1$ are incident on the X-ray linear sensor 115 and detected by one detection element 1151a, and only the characteristic X-rays emitted from the linear portion A2 having a wavelength $\lambda_2=(2d/n)\sin\theta_2$, which is different from $\lambda_1$, are incident on the X-ray linear sensor 115 and detected by the detection element 1151b, which is different from the detection element 1151a. Therefore, by detecting the intensity of the incident X-rays for each detection element 1151 of the X-ray linear sensor 115, the wavelength spectrum of the characteristic X-rays emitted from the irradiation area A can be obtained. The composition of the sample S can be analyzed based on this wavelength spectrum.

However, in the prior application X-ray spectrometer 110, the upper and lower limits of the measurable wavelength range are determined by the wavelength (specific wavelength) of the characteristic X-rays emitted from the linear portions A positioned at both end portions of the irradiation area and diffracted by the prescribed crystal surface of the spectroscopic crystal 114. Therefore, the characteristic X-rays having a wavelength outside the measureable wavelength range cannot be detected. For this reason, the types of elements that can be analyzed by a single device are limited. Further, since the range of the X-ray linear sensor 115 expected by the spectroscopic crystal 114 is limited, when the position and the orientation of the spectroscopic crystal 114 for characteristic X-rays of a specific wavelength emitted from a specific linear portion A1 are set, even if characteristic X-rays of another wavelength emitted from other linear portions A2 are incident on the spectroscopic crystal 114 at an angle satisfying the Bragg reflection condition, there are some cases in which the diffracted X-rays cannot be received and detected by the X-ray linear sensor 115. Furthermore, it is not possible to increase the detection sensitivity to measure trace elements, or to increase the wavelength (energy) resolution to perform a high precision measurement. The present inventors have configured the X-ray spectrometer according to the present invention in order to solve the problem that only the measurement of a predetermined condition can be performed by the prior application X-ray spectrometer 110. Hereinafter, the examples will be described. Note that in each example, the same constituent element as that of the prior application X-ray spectrometer 110 is allotted by the same reference numeral, and the description thereof will be omitted as appropriate.

Example 1

Figure 3:
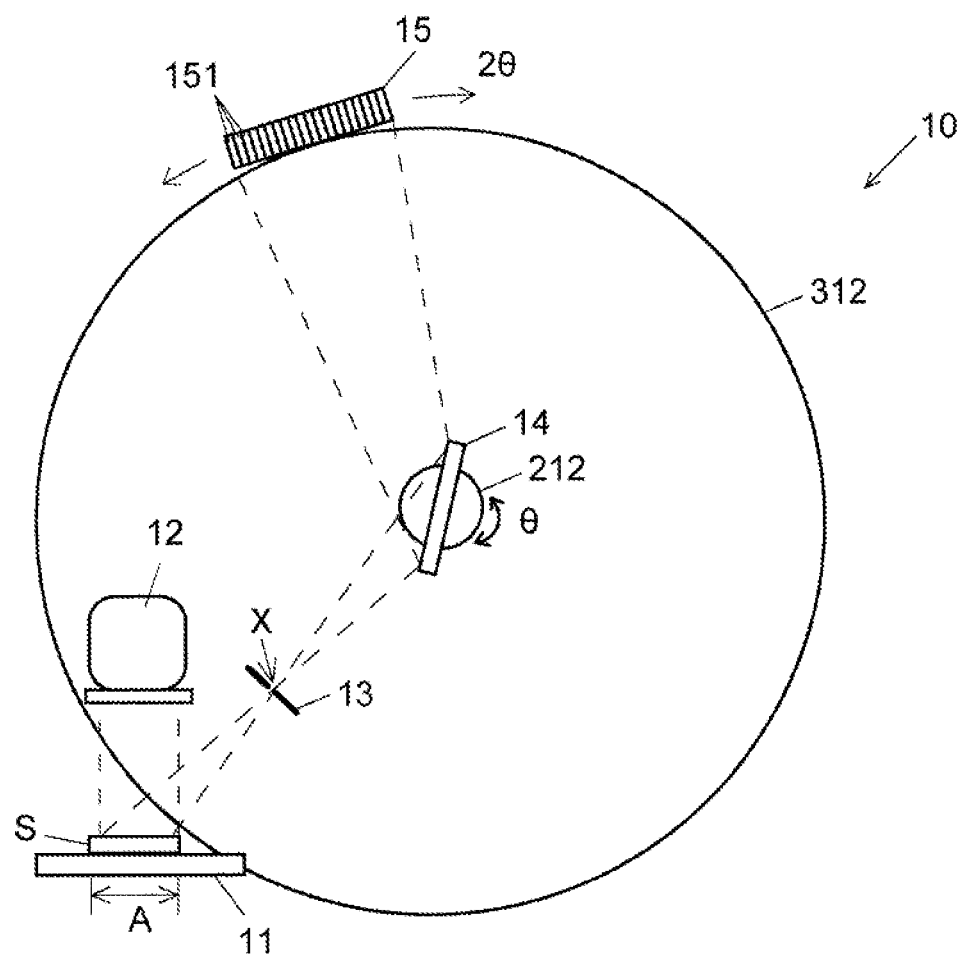
FIG. 3 is a schematic configuration diagram of an example (Example 1) of an X-ray spectrometer according to the present invention.

As shown in FIG. 3, the X-ray spectrometer 10 of Example 1 is provided with a first rotation mechanism 212 for rotating the spectroscopic crystal 14 and a second rotation mechanism 312 for rotating the X-ray linear sensor 15. The first rotation mechanism 212 is configured to change the angle formed by the prescribed crystal surface of the spectroscopic crystal 14. The second rotation mechanism 312 has a rotation center common to the first rotation mechanism 212, and is configured to rotate the X-ray linear sensor 15 so as to rotate the X-ray linear sensor 15 by 2θ in response to the rotation of the angle θ of (the prescribed crystal surface) of the spectroscopic crystal 14 by the first rotation mechanism 212. That is, the first rotation mechanism 212 and the second rotation mechanism 312 are a so-called goniometer. In this Example, the first moving mechanism according to the present invention is configured by the first rotation mechanism 212, and the second moving mechanism is configured by the second rotation mechanism 312.

In the X-ray spectrometer 10 of Example 1, the angle formed by the prescribed crystal surface of the spectroscopic crystal 14 with respect to the surface of the sample S placed on the sample holder 11 can be changed by the first rotation mechanism 212. With this, it is possible to change the wavelength of the X-rays satisfying the condition of the Bragg reflection at the prescribed crystal surface among the X-rays emitted from each linear portion within the irradiation area of the sample S. In the X-ray spectrometer 10 of Example 1, it is possible to detect the X-rays of different wavelengths emitted from the same position within the irradiation area of the sample S, and it is also possible to detect the X-rays of the same wavelength emitted from different positions of the sample surface. Therefore, it is possible to change the types of measurable elements by appropriately changing the wavelength range of the measurable X-rays. It is also possible to measure the intensity of the characteristic X-rays of the same element emitted from different positions within the irradiation area of the sample S.

Example 2

Similar to Example 1, the X-ray spectrometer 10A of Example 2 is also configured such that the types of measurable elements can be appropriately changed by changing the angle of the prescribed crystal surface of the spectroscopic crystal 14 with respect to the surface of sample S, but the configurations of the first moving mechanism 21A and the second moving mechanism 31A are different from Example 1. In the X-ray spectrometer 10A of Example 2, the first moving mechanism 21A is configured by a first linear motion mechanism 211A and a first rotation mechanism 212A, and the second moving mechanism 31A is configured by a second linear motion mechanism 311A and a second rotation mechanism 312A.

Figure 4:
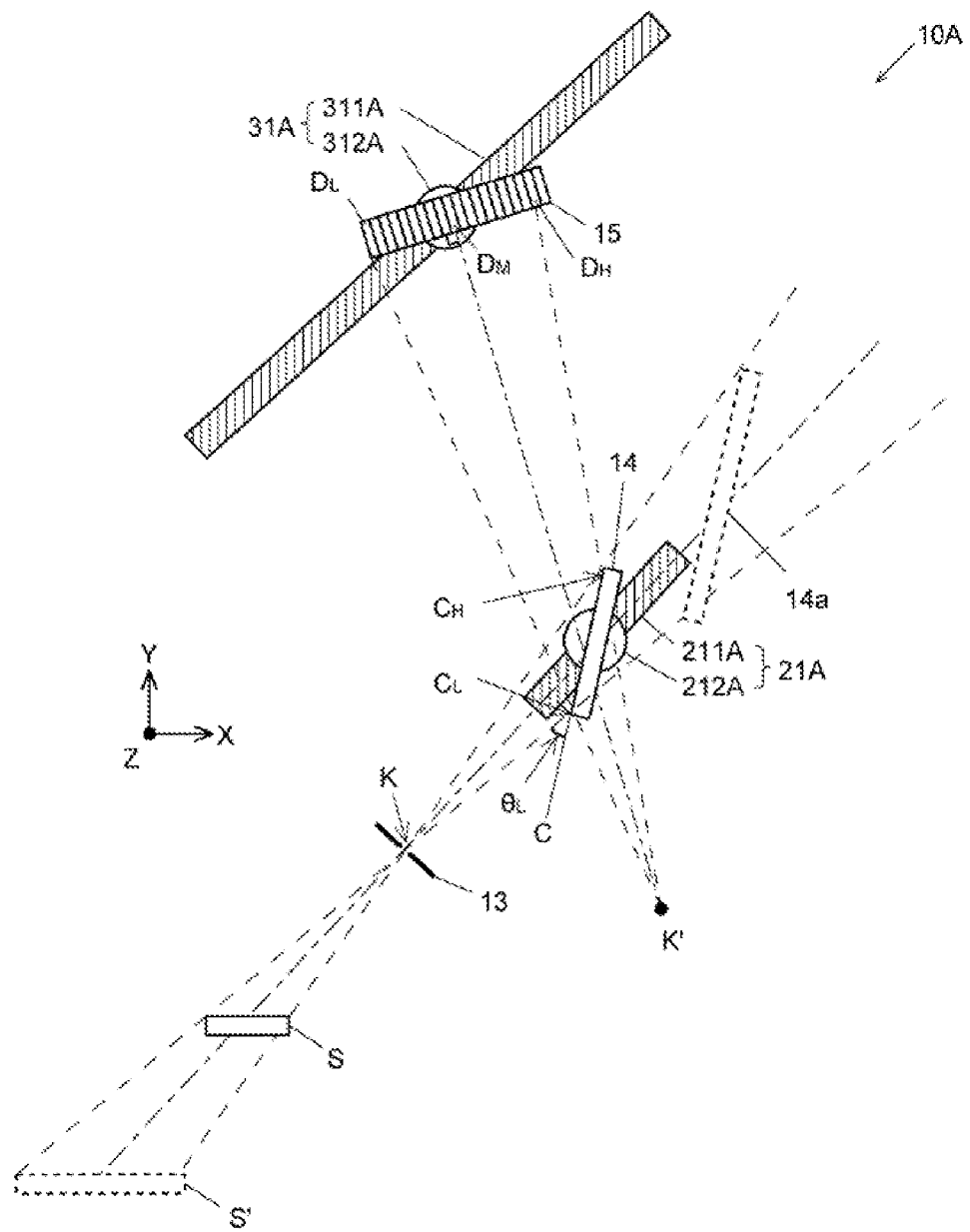
FIG. 4 is a diagram for explaining an arrangement of a measurement optical system in one example (Example 2) of the X-ray spectrometer according to the present invention.

The X-ray spectrometer 10A of Example 2 is designed based on the following concept. Here, it is assumed that the specification of the X-ray linear sensor 15 (1280 ch, distance of 0.05 mm between detection elements) is determined in advance. FIG. 4 shows the arrangement of each constituent element forming the optical path of the X-rays emitted from the irradiation area A of the sample S in the X-ray spectrometer 10A of Example 2. In FIG. 4, note that the descriptions of the sample holder 11 and the irradiation unit 12 are omitted.

incident on one end portion $D_L$ of the X-ray linear sensor 15. At this stage, only the angle formed by the prescribed crystal surface with respect to the surface of the sample S and the optical path length from the slit to the X-ray linear sensor 15 are determined. That is, at this stage, the spectroscopic crystal 14 can be placed at the position shown by the symbol 14a in FIG. 4. The distance from the spectroscopic crystal 14 to the X-ray linear sensor 15 is appropriately changed according to the position of the spectroscopic crystal 14 so that the optical path length does not change.

Subsequently, the size of the spectroscopic crystal 14 to be used is determined. With this, the position of the spectroscopic crystal 14 is determined. The wavelength λ satisfying the condition of the Bragg reflection at one end portion (the end portion opposite to the side on which the longest wavelength $\lambda_L$ is incident) of the spectroscopic crystal 14 becomes the shortest wavelength $\lambda_H$ (maximum energy $E_H$) in this arrangement. At this point, the relative positional relationship between the slit member 13, the spectroscopic crystal 14, and the X-ray linear sensor 15 (collectively referred to as a "measurement optical system") is determined.

Finally, the relative positional relationship between the sample S (sample holder 11) and the measurement optical system is determined. Thereby, the position and the size of the irradiation area A on the surface of the sample S are determined (see the symbol S and the symbol S' in FIG. 4).

For each of a plurality of energy ranges (wavelength ranges) set by assuming that the prescribed crystal surface of the spectroscopic crystal 14 is the (200) plane of the LiF crystal and different target elements are measured, the results of the obtained positions of the measurement optical system based on the above concept are shown in the following table.

TABLE 1

| | | Measurement energy | | | | Crystal position | | Sensor position | |
|---|---|---|---|---|---|---|---|---|---|
| Classification | Target element | $E_L$ (keV) | $E_M$ (keV) | $E_H$ (keV) | ΔE (keV) | $C_X$ (mm) | $C_Y$ (mm) | $C_X$ (mm) | $C_Y$ (mm) |
| Low 1 | V, Cr, Mn, Nd-Eu, Gd | 4.9 | 5.5 | 6.132 | 0.937 | 219 | 139 | 184 | 326 |
| Low 2 | Mn, Fe, Co, Ni, Cu, Gd, Td, Dy-Hf | 5.98 | 7.0 | 8.058 | 1.594 | 187 | 119 | 216 | 347 |
| Middle 1 | N-As, Se, Ta, W-Pt, Au, Hg-Pb-At | 7.96 | 9.75 | 11.58 | 2.797 | 173 | 110 | 262 | 376 |
| Middle 2 | As-Zr, Pb-U-Pu Am-Es | 10.48 | 13.25 | 16.06 | 4.328 | 164 | 104 | 322 | 413 |
| High 1 | Nd-Cd, In, Sn, U-Pu, Am-Lr | 15.88 | 20.75 | 25.65 | 7.609 | 153 | 98 | 486 | 515 |
| High 2 | Sb-Nd-Eu | 25.42 | 34 | 42.60 | 13.406 | 150 | 96 | 579 | 572 |

First, the center wavelength $\lambda_M$ in the measurement range is determined. From this center wavelength $\lambda_M$ and the surface distance d of the prescribed crystal surface, based on the condition of the Bragg reflection, the incident angle $\theta_M$ of the X-rays incident from the sample S on the central portion of the spectroscopic crystal 14 through the slit is determined. Then, with this, the orientation (the angle with respect to the surface of the sample S) of the prescribed crystal surface of the spectroscopic crystal 14 is determined.

Next, the minimum energy $E_L$ (longest wavelength $\lambda_L$) in the measurement range is determined, and the optical path length from the slit to the X-ray linear sensor 15 is determined so that the light of the longest wavelength $\lambda_L$ is Here, the measurement energy range is classified into six. The low energy first classification (Low 1) is a classification assuming the measurement of the characteristic X-rays emitted from V, Cr, Mn, Nd-Eu, and Gd, the minimum energy $E_L$ in the measurement range is 4.9 keV, the center energy $E_M$ (the X-ray energy of the above center wavelength $\lambda_M$) is 5.5 keV, the maximum energy $E_H$ is 6.132 keV, and the energy resolution is 0.937 eV. Further, in the coordinate system shown in FIG. 3, the coordinate position of the center of the X-ray incident surface of the spectroscopic crystal 14 where the center of the irradiation area A of the sample S is the origin (hereinafter described as a "coordinate position of the spectroscopic crystal 14") is X=219 mm and Y=139 mm, and the coordinate position of the center of the X-ray incident surface of the X-ray linear sensor 15 (hereinafter described as a "coordinate position of the X-ray linear sensor 15") is X=184 mm and Y=326 mm.

The low energy second classification (Low 2) is a classification assuming the measurement of the characteristic X-rays emitted from Mn, Fe, Co, Ni, Cu, Gd, Td, Dy-Hf, the minimum energy $E_L$ in the measurement range is 5.98 keV, the center energy $E_M$ is 7.0 keV, the maximum energy $E_H$ is 8.058 keV, and the energy resolution is 1.594 eV. Further, in the coordinate system shown in FIG. 3, the coordinate position of the spectroscopic crystal 14 where the center of the irradiation area A of the sample S is the origin is X=187 mm, Y=119 mm, and the coordinate position of the X-ray linear sensor 15 is X=216 mm and Y=347 mm.

The middle energy first classification (Middle 1) is a classification assuming the measurement of the characteristic X-rays emitted from Ni-As, Se, Ta, W-Pt, Au, Hg-Pb-At, the minimum energy $E_L$ in the measurement range is 7.96 keV, the center energy $E_M$ is 9.75 keV, the maximum energy $E_H$ is 11.58 keV, and the energy resolution is 2.797 eV. Further, in the coordinate system shown in FIG. 3, the coordinate position of the spectroscopic crystal 14 where the center of the irradiation area A of the sample S is the origin is X=173 mm and Y=110 mm, and the coordinate position of the X-ray linear sensor 15 is X=262 mm and Y=376 mm.

The middle energy second classification (Middle 2) is a classification assuming the measurement of the characteristic X-rays emitted from As-Zr, Pb-U-Pu, Am-Es, the minimum energy $E_L$ in the measurement range is 10.48 keV, the center energy $E_M$ is 13.25 keV, the maximum energy $E_H$ is 16.06 keV, and the energy resolution is 4.328 eV. Further, in the coordinate system shown in FIG. 3, the coordinate position of the spectroscopic crystal 14 where the center of the irradiation area A of the sample S is the origin is X=164 mm and Y=104 mm, and the coordinate position of the X-ray linear sensor 15 is X=322 mm and Y=413 mm.

The high energy first classification (High 1) is a classification assuming the measurement of the characteristic X-rays emitted from Nd-Cd, In, Sn, U-Pu, Am-Lr, the minimum energy $E_L$ in the measurement range is 15.88 keV, the center energy $E_M$ is 20.75 keV, the maximum energy $E_H$ is 25.65 keV, and the energy resolution is 7.609 eV. Further, in the coordinate system shown in FIG. 3, the coordinate position of the spectroscopic crystal 14 where the center of the irradiation area A of the sample S is the origin is X=153 mm, Y=98 mm, and the coordinate position of the X-ray linear sensor 15 is X=486 mm and Y=515 mm.

The high energy second classification (High 2) is a classification assuming the measurement of the characteristic X-rays emitted from Sb-Nd-Eu, the minimum energy $E_L$ in the measurement range is 25.42 keV, the center energy $E_M$ is 34 keV, the maximum energy $E_H$ is 42.60 keV, and the energy resolution is 13.406 eV. Further, in the coordinate system shown in FIG. 3, the coordinate position of the spectroscopic crystal 14 where the center of the irradiation area A of the sample S is the origin is X=150 mm and Y=96 mm, and the coordinate position of the X-ray linear sensor 15 is X=579 mm and Y=572 mm.

In the case where each member is arranged according to the above concept, since X-rays are not incident on a part of the high energy side of 1280 detection elements of the X-ray linear sensor 15, the value obtained by dividing the measurement energy range by the resolution is different from the number of channels (1280) of the X-ray linear sensor 15. Here, a value obtained by dividing the range from the minimum energy $E_L$ to the center energy $E_M$ by half of the number of channels 640 is defined as resolution ΔE.

Figure 5:
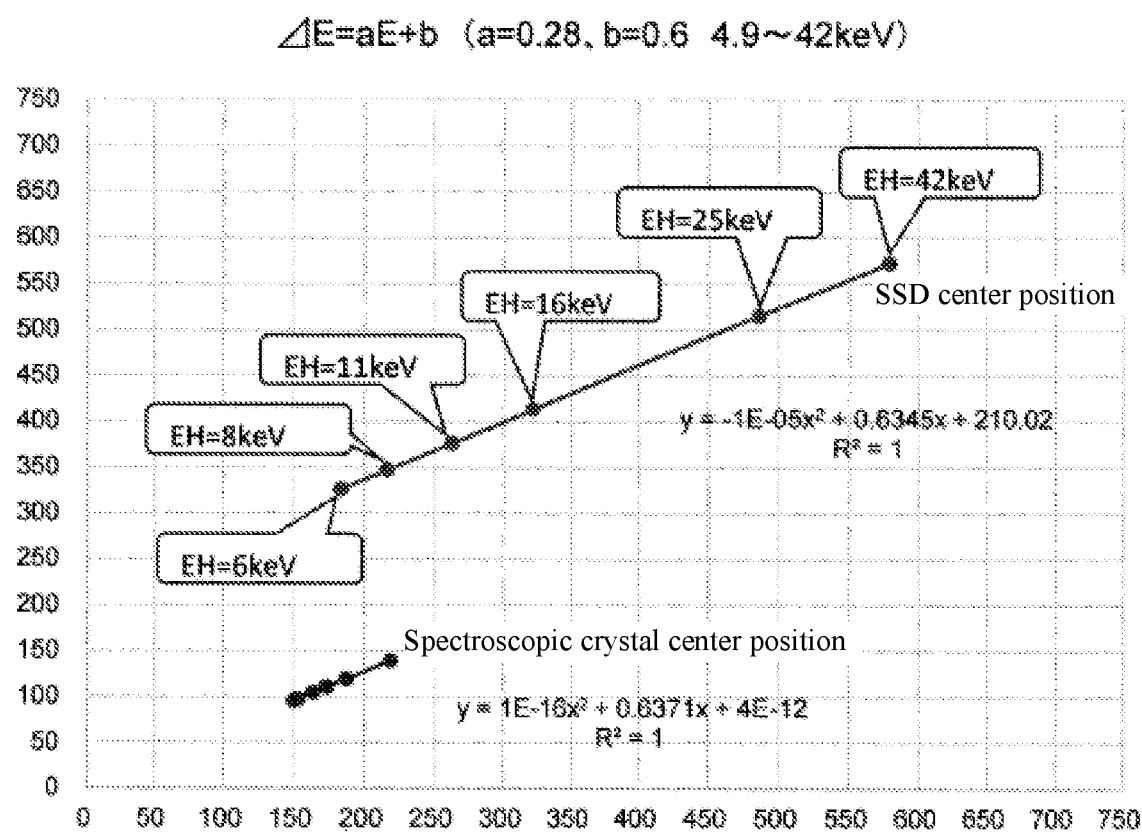
FIG. 5 is a graph for explaining a center position of a spectroscopic crystal and a center position of an X-ray linear sensor in the X-ray spectrometer of Example 2.

FIG. 5 is obtained by plotting the center of the spectroscopic crystal 14 and the center position of the X-ray linear sensor 15 based on the results. The horizontal axis denotes a coordinate in the X-direction in FIG. 4, and the vertical axis denotes a coordinate in the Y-direction in FIG. 4. From this graph, it can be understood that the coordinates of the center positions of the spectroscopic crystals 14 are positioned on a straight line. Therefore, it can be understood that it is enough that the spectroscopic crystal 14 is moved to the coordinate position by the first linear motion mechanism 211A and inclined to a predetermined angle (determined by the above design) by the first rotation mechanism 212A. Further, since the coordinates of the center positions of the X-ray linear sensor 15 are also positioned on a straight line, it can be understood that it is enough that the spectroscopic crystal 14 is moved to the coordinate position by the second linear motion mechanism 311A and inclined to a predetermined angle (determined by the above design) by the second rotation mechanism 312A. As can be understood from the graph of FIG. 5, it is not necessary to move the center position of the spectroscopic crystal 14 so much even if the energy range is different. Therefore, in terms of cost reduction, the first moving mechanism 21A may be configured by only the first rotation mechanism 212A.

When the diffraction angle degree in different wavelength ranges is determined based on the conditional expression of the Bragg reflection, in cases where the optical path length from the irradiation area of the sample S to the X-ray linear sensor 15 is constant, the resolution deteriorates as the X-rays to be measured become a short wavelength (high energy). That is, as in Example 1, when the first moving mechanism is constituted only by the first rotation mechanism 212 and the second moving mechanism is constituted only by the second rotation mechanism 312, since the optical path length does not change, the wavelength (energy) resolution deteriorates as the characteristic X-rays to be measured become higher energy. On the other hand, in Example 2, as shown in FIG. 5, since the X-ray linear sensor 15 is moved to a position far from the origin so it becomes high energy (short wavelength) and the above optical path length is made longer, the measurement can be performed with higher resolution than in Example 1 in the short wavelength (high energy) region.

In Example 2 described above, an example is described in which it is assumed that the characteristic X-rays having energy of 5 keV or more are measured, but the same concept can be used in measuring the characteristic X-rays having energy less than 5 keV. However, the types of the X-ray linear sensor 15 that can be used are different between the energy region of 5 keV or more and the energy region of less than 5 keV. In the energy region of 5 keV or more, for example, a silicon strip detector (SSD) is used as the X-ray linear sensor 15, but this cannot be used as it is in the energy region of less than 5 keV. In the energy region of less than 5 keV, it is necessary to use, for example, a CCD detector as the X-ray linear sensor 15. Moreover, in such a low energy region, for example, when measuring from the Kα line of B (6775 nm, 0.183 keV) to the Kβ line of Ti (251 nm, 4.932 keV), the wavelength range is too wide (the ratio of the longest wavelength to the shortest wavelength is about 27 times). Therefore, when detecting all X-rays satisfying the condition of the Bragg reflection only by a single spectroscopic crystal, a large number of CCD detectors must be arranged, which makes the apparatus expensive. Therefore, in such a case, it is preferable to switch and use a plurality of spectral crystals or artificial multilayer films different in grating constant as the spectroscopic crystal 14. An arrangement example of a measurement optical system in the case of measuring from Kα line of B (6775 nm, 0.183 keV) to Kβ line of Ti (251 nm, 4.932 keV) by using two types of spectroscopic crystals with different grating constants in combination is shown in the table below.

TABLE 2

| Classification | Target element | Grating constant | Measurement energy | | | Crystal position | | Sensor positon | |
|---|---|---|---|---|---|---|---|---|---|
| | | | $E_L$ (keV) | $E_M$ (keV) | $E_H$ (keV) | $C_X$ (mm) | $C_Y$ (mm) | $C_X$ (mm) | $C_Y$ (mm) |
| Light 1 | B-F | 50 | 0.17 | 0.45 | 0.73 | 76.4 | 48.7 | 168.6 | 122.9 |
| Light 2 | Na-V | 10 | 1.0 | 3.0 | 5.0 | 75.6 | 48.2 | 181.3 | 128.5 |

The ultra low energy first classification (Light 1) for a light element measurement is an energy classification assuming the measurement of characteristic X-rays emitted from B-F, and the minimum energy $E_L$ of the measurement range is 0.17 keV, the center energy $E_M$ is 0.45 keV, and the maximum energy $E_H$ is 0.73 keV. Further, in the coordinate system shown in FIG. 4, the coordinate position of the spectroscopic crystal 14 where the center of the irradiation area A of the sample S is the origin is X=76.4 mm and Y=48.7 mm, and the coordinate position of the X-ray linear sensor 15 is X=168.6 mm and Y=122.9 mm.

The ultra low energy second classification (Light 2) for a light element measurement is an energy classification assuming the measurement of characteristic X-rays emitted from Na-V, and the minimum energy $E_L$ of the measurement range is 1.0 keV, the center energy $E_M$ is 3.0 keV, and the maximum energy $E_H$ is 5.0 keV. Further, in the coordinate system shown in FIG. 4, the coordinate position of the spectroscopic crystal 14 where the center of the irradiation area A of the sample S is the origin is X=75.6 mm, Y=48.2 mm, and the coordinate position of the X-ray linear sensor 15 is X=181.3 mm and Y=128.5 mm.

Similar to the measurement of the energy region of 5 keV or more described with reference to FIG. 5, the position of the spectroscopic crystal 14 hardly changes even if the energy range of the X-rays to be measured changes. Therefore, in the same manner as described above, the first moving mechanism 21A can be configured only by the first rotation mechanism 212A. Of course, the first moving mechanism 21A can also be configured by the first linear motion mechanism 211A and the first rotation mechanism 212A.

Example 3

Next, an X-ray spectrometer of Example 3 will be described. Example 3 is characterized by the configuration of the slit member 13. Specifically, it is characterized in that the opening width of the slit member 13 is variable.

Figure 6:
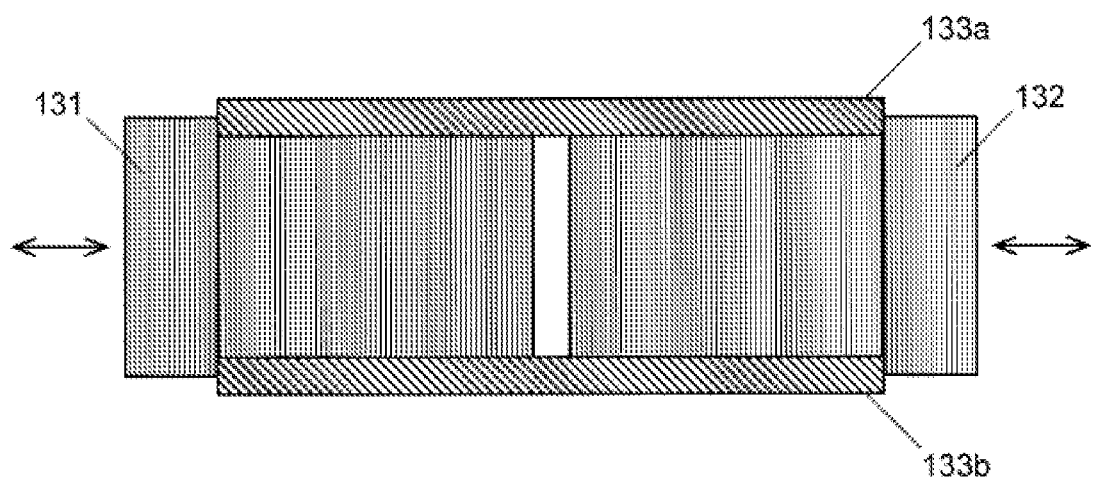
FIG. 6 is a configuration example of a slit member used in an example (Example 3) of the X-ray spectrometer according to the present invention.
Figure 7:
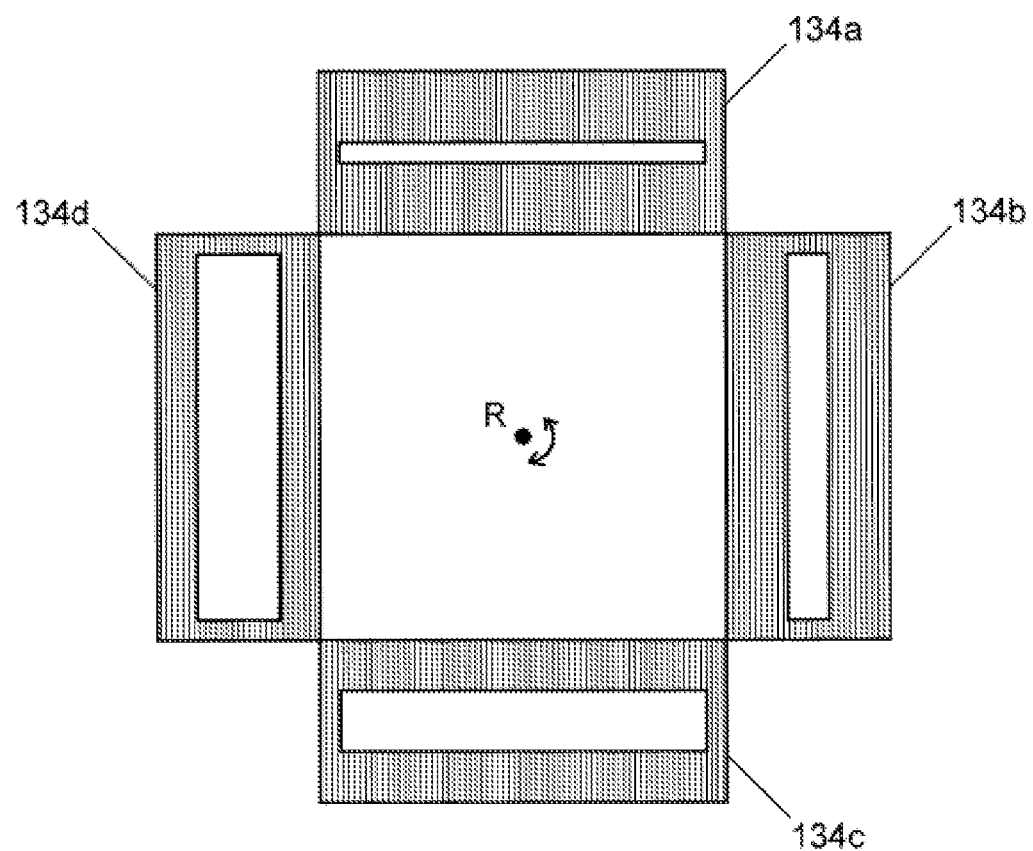
FIG. 7 is another configuration example of a slit member used in an example (Example 3) of the X-ray spectrometer according to the present invention.

When the opening width of the slit member 13 is changed, the wavelength (energy) resolution deteriorates, but the X-rays pass through the slit and are diffracted by the spectroscopic crystal 14, so the light amount of X-rays incident on the X-ray linear sensor 15 increases. Therefore, for example, in the case of measuring a trace element, a high sensitivity measurement in which the opening width of the slit member 13 is enlarged is performed, and in the case of performing a precise analysis, a high resolution measurement can be performed by narrowing the opening width of the slit member 13. This can be performed by configuring, as shown in FIG. 6, such that sides of a pair of slit plates 131 and 132 are accommodated in the linear guides 133a and 133b of the main body of the slit member 13 and the slit plates are arranged movably along the extending direction of the linear guides 133a and 133b, or as shown in FIG. 7, such that a plurality of slit members 134a to 134d in which slits having different opening widths are formed are arranged around the rotation axis R and rotated about the rotation axis R to switch the slit members 134a to 134d. In the former case, only one of the slit plates may be movable relative to the other, but in that case, since the central position of the slit changes, it is preferable to move the pair of slit plates 131 and 132 equally to change the opening width of the slit member 13 so that central position of the slit does not change.

Figure 8:
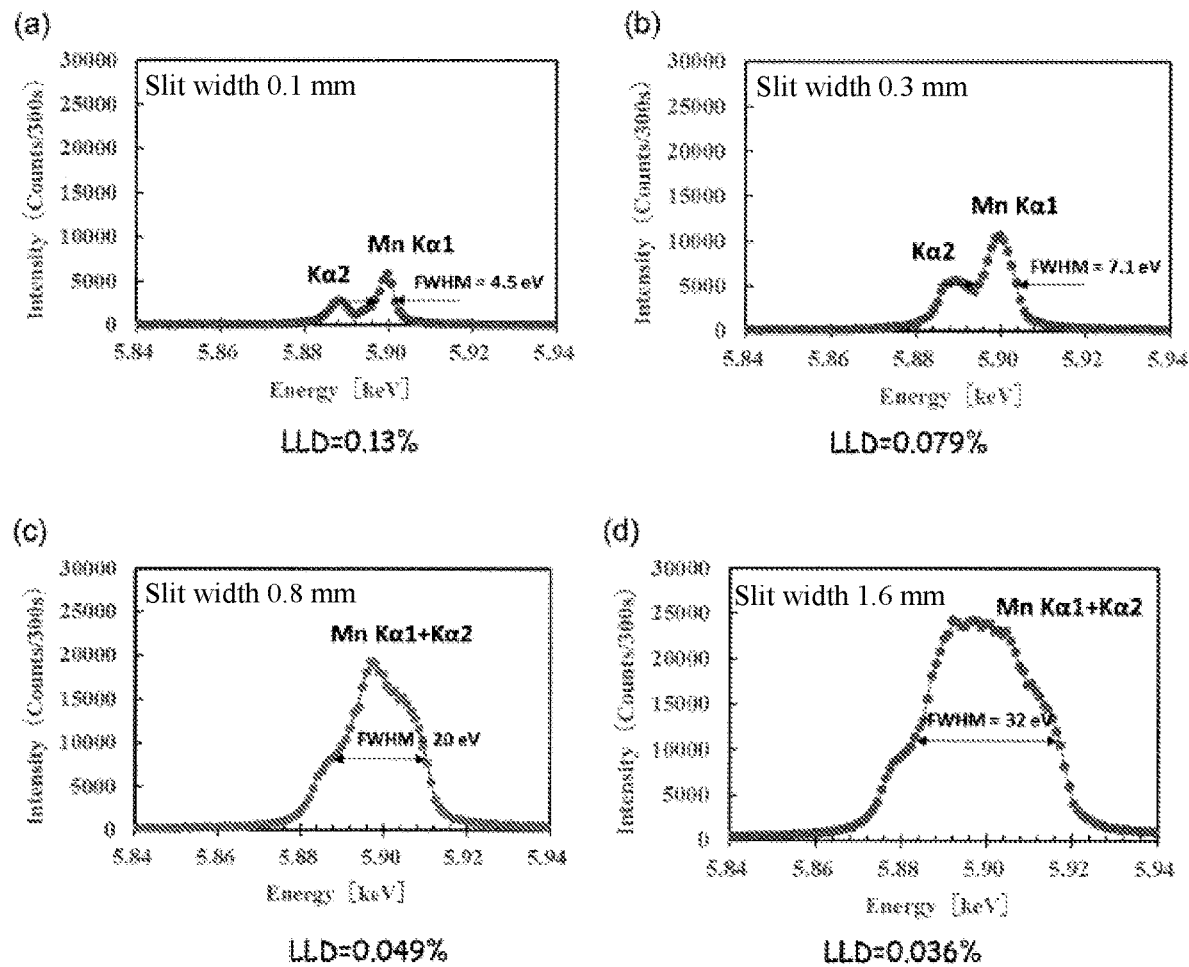
FIG. 8 shows the results of measuring characteristic X-rays using the X-ray spectrometer of Example 3 while changing the opening width of the slit.

As a measurement example using the X-ray spectrometer of Example 3, FIG. 8 shows the results of measuring the Kα1 line of Mn under four types of conditions (0.1 mm, 0.3 mm, 0.8 mm, 1.6 mm) with different slit widths. Moreover, the detection lower limit (LLD) was calculated by the following Formula using the measurement results obtained on each condition.

$$LLD(\%) = 3 \cdot D \cdot \sqrt{(I_b/t)}/I_p \qquad \text{Formula 1}$$

The above formula is a formula for obtaining the lower detection limit from one standard sample, wherein D is the concentration (%) of the standard sample, Ib is the background intensity (cps), Ip is the signal net intensity (cps), and t is the integration time (s).

FIG. 8(a) shows a measurement result when the slit width was 0.1 mm, and the full width at half maximum (FWHM) was 4.5 eV, and the lower detection limit (LLD: Lower Limit of Detection) was 0.13%. FIG. 8(b) shows a measurement result when the slit width was 0.3 mm, and the full width at half maximum (FWHM) was 7.1 eV, and the lower detection limit was 0.079%. FIG. 8(c) shows a measurement result when the slit width was 0.8 mm, and the full width at half maximum (FWHM) was 20 eV, and the lower detection limit was 0.049%. FIG. 8(d) shows a measurement result when the slit width was 1.6 mm, and the full width at half maximum (FWHM) was 32 eV, and the lower detection limit was 0.036%. As can be understood from these results, it is possible to perform a measurement according to the purpose of the measurement (high sensitivity analysis, high resolution analysis) by appropriately changing the opening width of the slit member 13. The above measurements were all performed in the air atmosphere. If the same measurement is performed in a vacuum atmosphere, the lower detection limit is considered to become lower (i.e., the sensitivity is improved).

Modification

Figure 9:
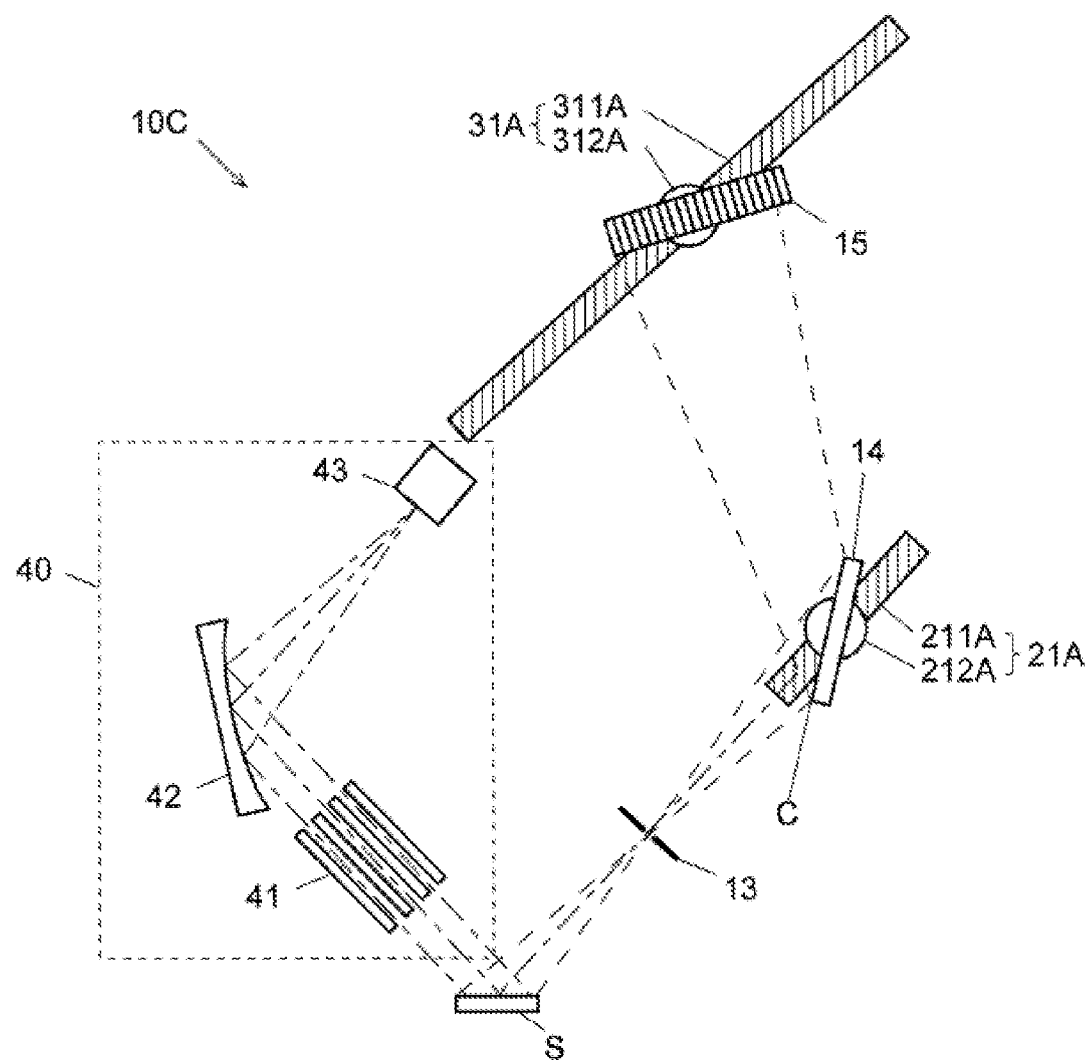
FIG. 9 is a schematic configuration diagram of an X-ray spectrometer of a modification.

In the modification X-ray spectrometer 10C, a specific wavelength measurement optical system 40 for measuring characteristic X-rays emitted from a specific element is added to the above-mentioned Examples 1 to 3. In a specific wavelength measurement optical system including the X-ray spectrometer 10C of the modification, as shown in FIG. 9, X-rays emitted in various directions from the irradiation area of the sample S are introduced into the solar slit 41. The solar slit 41 is configured by arranging a plurality of flat partition wall plates in parallel, and only the light traveling in a direction parallel to the surface of the partition wall plate passes through the solar slit 41, so the parallel light traveling in the parallel direction is taken out. Then, parallel light with mixed X-rays of various wavelengths are made to be incident on a concave diffraction grating 42 to diffract only X-rays of wavelengths satisfying the conditions of the Bragg reflection and focus the diffracted light to one point on the light receiving surface of the detector 43.

In the X-ray spectrometer 10C of the modification, by measuring the characteristic X-rays emitted from a plurality of target elements by any of the measurement optical systems described in Examples 1 to 3, and further measuring the intensity of the characteristic X-rays emitted from the entire irradiation area of the sample S for one specific element, a high precision quantitative measurement, etc., can be performed.

The above-described examples are mere examples and can be appropriately changed in accordance with the spirit of the present invention.

For example, the design concept described in Example 2 is an example, and the arrangement of each component can be determined by another procedure. For example, although Example 2 is configured so as not to use all detection elements of the X-ray linear sensor 15, it is also possible to design a measurement optical system so as to use all detection elements.

Further, an X-ray spectrometer may be configured to provide the configurations of Examples 1 to 3.

Furthermore, it may be configured such that a plurality of specific wavelength measurement optical systems described in the modification are provided to measure characteristic X-rays emitted from specific elements.

The degree of freedom of measurements can be increased by changing various measurement parameters by appropriately using the first moving mechanism and the second moving mechanism by changing the wavelength (energy) of measurements by changing the wavelength width of X-rays incident on each of the plurality of detection elements configuring the incident surface of the X-ray linear sensor by changing the optical path length that the characteristic X-rays emitted from the irradiation region of the sample are incident on the X-ray linear sensor by changing the distance from the sample surface to the prescribed crystal surface by the first moving mechanism while fixing the relative positional relationship between the spectroscopic crystal and the X-ray linear sensor.

DESCRIPTION OF REFERENCE SYMBOLS 10, 10A, 10C: X-ray spectrometer
11: sample holder
12: irradiation portion
13: slit member
131: slit plate
133a, 133b: linear guide portion
134a to 134d: slit member
14: spectroscopic crystal
15: X-ray linear sensor
21, 21A: first moving mechanism
211A: first linear motion mechanism
212, 212A: first rotation mechanism
31, 31A: second moving mechanism
311A: second linear motion mechanism
312, 312A: second rotation mechanism
40: specific wavelength measurement optical system
41: solar slit
42: concave diffraction grating
43: X-ray detector

The invention claimed is:

1. An X-ray spectrometer comprising:
   a) an excitation source configured to irradiate excitation rays for generating characteristic X-rays onto a prescribed irradiation area of a sample,
   b) a diffraction member provided to face the irradiation area;
   c) a slit member provided between the irradiation area and the diffraction member, the slit member having a slit extending parallel to the irradiation area and a prescribed surface of the diffraction member;
   d) an X-ray linear sensor having a light-incident surface in which a plurality of detection elements are arranged in a direction perpendicular to a longitudinal direction of the slit;
   e) a first moving mechanism configured to change an angle between the sample surface and the prescribed surface, and/or a distance between the sample surface and the prescribed surface by moving the diffraction member within a plane perpendicular to the longitudinal direction; and
   f) a second moving mechanism configured to position the X-ray linear sensor on a path of the characteristic X-rays passed through the slit and diffracted by the prescribed surface by moving the X-ray linear sensor within the plane perpendicular to the longitudinal direction, in conjunction with the first moving mechanism so that a wavelength range of X-ray detected by the X-ray linear sensor is changed.

2. The X-ray spectrometer as recited in claim 1, wherein the first moving mechanism is provided with a rotation mechanism and a linear motion mechanism.

3. The X-ray spectrometer as recited in claim 1, wherein the second moving mechanism is provided with a rotation mechanism and a linear motion mechanism.

4. The X-ray spectrometer as recited in claim 1, wherein the diffraction member is selected from a plurality of diffraction members arranged switchably and different in diffractable X-ray wavelength range.

5. The X-ray spectrometer as recited in claim 1, wherein the X-ray linear sensor is selected from a plurality of X-ray linear sensors arranged switchably and different in detectable X-ray wavelength range.

6. The X-ray spectrometer as recited in claim 1, wherein the X-ray linear sensor is composed of detection elements arranged two-dimensionally in a direction perpendicular to the longitudinal direction and a direction orthogonal to the direction perpendicular to the longitudinal direction, and is configured to output an output signal of the detection elements arranged in the direction orthogonal to the direction perpendicular to the longitudinal direction as one output signal.

7. The X-ray spectrometer as recited in claim 1, further comprising:
   e) a parallel light slit member configured to pass only X-rays traveling in a specific direction among the X-rays emitted from the irradiation area;
   f) a concave diffraction member configured to diffract and collect light having a specific wavelength among X-rays passed through the parallel light slit member and advancing to the specific direction; and g) an X-ray detector placed so that a light receiving surface is positioned on the prescribed surface.

8. An X-ray spectrometer comprising:

an excitation source configured to irradiate excitation rays for generating characteristic X-rays onto a prescribed irradiation area of a sample, a diffraction member provided to face the prescribed irradiation area;

a slit member provided between the prescribed irradiation area and the diffraction member, the slit member having a slit extending parallel to the prescribed irradiation area and a prescribed surface of the diffraction member;

an X-ray linear sensor having a light-incident surface in which a plurality of detection elements are arranged in a direction perpendicular to a longitudinal direction of the slit;

a first moving mechanism configured to change an angle between the sample surface and the prescribed surface, and/or a distance between the sample surface and the prescribed surface by moving the diffraction member within a plane perpendicular to the longitudinal direction;

a second moving mechanism configured to position the X-ray linear sensor on a path of the characteristic X-rays passed through the slit and diffracted by the prescribed surface by moving the X-ray linear sensor within the plane perpendicular to the longitudinal direction;

a parallel light slit member configured to pass only X-rays traveling in a specific direction among the X-rays emitted from the prescribed irradiation area;

a concave diffraction member configured to diffract and collect light having a specific wavelength among X-rays passed through the parallel light slit member and advancing to the specific direction; and an X-ray detector placed so that a light receiving surface is positioned on the prescribed surface.

9. The X-ray spectrometer as recited in claim 8, wherein the first moving mechanism is provided with a rotation mechanism and a linear motion mechanism.

10. The X-ray spectrometer as recited in claim 8, wherein the second moving mechanism is provided with a rotation mechanism and a linear motion mechanism.

11. The X-ray spectrometer as recited in claim 8, wherein the diffraction member is selected from a plurality of diffraction members arranged switchably and different in diffractable X-ray wavelength range.

12. The X-ray spectrometer as recited in claim 8, wherein the X-ray linear sensor is selected from a plurality of X-ray linear sensors arranged switchably and different in detectable X-ray wavelength range.

13. The X-ray spectrometer as recited in claim 8, wherein the X-ray linear sensor is composed of detection elements arranged two-dimensionally in a direction perpendicular to the longitudinal direction and a direction orthogonal to the direction perpendicular to the longitudinal direction, and is configured to output an output signal of the detection elements arranged in the direction orthogonal to the direction perpendicular to the longitudinal direction as one output signal.

* * * * *